(12) United States Patent
Singh et al.

(10) Patent No.: US 8,799,763 B1
(45) Date of Patent: Aug. 5, 2014

(54) METHODS AND APPARATUS FOR ASSISTING IN COMPLETION OF A FORM

(75) Inventors: Sanjeev Singh, South San Francisco, CA (US); Paul Buchheit, Mountain View, CA (US)

(73) Assignee: Google Inc., Mountain View, CA (US)

( * ) Notice: Subject to any disclaimer, the term of this patent is extended or adjusted under 35 U.S.C. 154(b) by 512 days.

(21) Appl. No.: 13/212,379

(22) Filed: Aug. 18, 2011

Related U.S. Application Data

(62) Division of application No. 10/425,295, filed on Apr. 29, 2003, now Pat. No. 8,190,989.

(51) Int. Cl.
*G06F 17/00* (2006.01)
*G06F 17/24* (2006.01)

(52) U.S. Cl.
CPC .................................. *G06F 17/243* (2013.01)
USPC .......................................... 715/226; 715/224

(58) Field of Classification Search
CPC ...................................................... G06F 17/243
USPC ................................................ 715/224, 226
See application file for complete search history.

(56) References Cited

U.S. PATENT DOCUMENTS

| | | | |
|---|---|---|---|
| 5,805,158 A | 9/1998 | Bertram et al. ................... 15/764 |
| 6,006,225 A | 12/1999 | Bowman et al. ................... 707/5 |
| 6,199,067 B1 | 3/2001 | Geller | |
| 6,323,853 B1 * | 11/2001 | Hedloy .......................... 715/810 |
| 6,421,733 B1 | 7/2002 | Tso et al. ....................... 709/246 |
| 6,564,213 B1 | 5/2003 | Ortega et al. ....................... 707/5 |
| 6,603,489 B1 | 8/2003 | Edlund et al. ................... 715/780 |
| 6,651,217 B1 * | 11/2003 | Kennedy et al. ............... 715/224 |
| 6,662,340 B2 * | 12/2003 | Rawat et al. ................... 715/236 |
| 6,675,204 B2 | 1/2004 | De Boor et al. ............... 709/217 |
| 6,879,691 B1 | 4/2005 | Koretz | |
| 6,981,040 B1 | 12/2005 | Konig et al. | |
| 7,320,031 B2 | 1/2008 | Konig et al. | |
| 7,343,551 B1 * | 3/2008 | Bourdev ....................... 715/224 |
| 2002/0042265 A1 | 4/2002 | Kumaran et al. ............. 455/414 |

OTHER PUBLICATIONS

"RoboForm: User Manual", retrieved from Internet Archive Wayback Machine, http://roboform.com/manual.html, Dec. 2001, Updated Nov. 30, 2001, copyright Siber Systems 1999-2001, p. 1-19.*

Fleet, D. et al., "Teach Yourself Active Web Database Programming in 21 Days," Copyright 1997, Sams.net Publishing, pp. v-vii, 124,126, 198-200, 218-220.

* cited by examiner

*Primary Examiner* — Amelia Tapp
(74) *Attorney, Agent, or Firm* — Morgan, Lewis & Bockius LLP

(57) ABSTRACT

Methods and apparatus are described for sending completions to a client for aiding a user in completing electronic forms. The invention may identify a plurality of completions corresponding to a user; form a plurality of selected completions from the plurality of completions based, at least in part, on a use pattern of the user; and transmit the plurality of selected completions to a client associated with the user.

19 Claims, 8 Drawing Sheets

Fill Form

City: b
- Baldwin
- Barbour
- Bibb
- Blount
- Bullock
- Butler
- Badge
- Mount Badger
- Barrow
- ----- more -----

State: [ ]  [Submit]

FIG. 7

METHODS AND APPARATUS FOR ASSISTING IN COMPLETION OF A FORM

RELATED APPLICATIONS

This application is a divisional of U.S. patent application Ser. No. 10/425,295, filed Apr. 29, 2003 now U.S. Pat. No. 8,190,989, entitled "Methods and Apparatus for Assisting in Completion of a Form," which is incorporated herein by reference in its entirety.

FIELD OF THE INVENTION

The present invention relates generally to assisting in the completion of a form and, more particularly, to assisting in the completion of fields within electronic forms.

BACKGROUND OF THE INVENTION

The use of electronic forms has become an increasingly common tool for gathering information from a user of the electronic form. An electronic form may include fields which request information from the user such as a name field, a home address field, an email field, and the like. With the increased use of the Internet, more people are filling out electronic forms. For example, electronic forms may be utilized to collect financial information and authenticate the identity of the user in an electronic commerce transaction. The electronic commerce transaction may exchange money for goods and/or services. Instead of completing a traditional paper-based purchase order form which details shipping information and payment information of the consumer, electronic forms may be utilized to capture this consumer information. Electronic commerce is merely one such example of the use of electronic forms. Many other applications of electronic forms are currently utilized.

With the increased use of electronic forms, supplying information within these forms can be time-consuming, burdensome, and tedious. To automate the completion these electronic forms, browsers such as Internet Explorer™ include an automatic complete function. The browser captures information by monitoring information inputted by the user. At a later time as the user is completing a field within an electronic form, the browser may provide suggestions for completing the field based upon an initial, partial entry by the user. Unfortunately with automatic field completion initiated by a browser, the user typically loses the automatic completion function when utilizing a different computer such as a public kiosk, a cybercafe, or any computer other than the user's usual computer.

In addition, existing browsers with automatic completion typically complete prefixes; for example, to differentiate between "Diane Feinstein" and "Diane Sawyer", users need to enter "Diane F" or "Diane S" respectively, rather than just typing "Sawyer" to generate a completion to "Diane Sawyer" because "Sawyer" is not a prefix of "Diane Sawyer".

Additionally, there may be security concerns with automatic field completion utilizing a browser. With automatic field completion within a browser, the browser typically captures all information entered by a user through the browser. In this case, confidential information may be readily available to subsequent users of the browser. The confidential information may contain information such as passwords, social security numbers, credit card accounts, banking accounts, and the like. Revealing this confidential information may cause a breach in security and privacy for the user.

It would be useful, therefore, to have methods and apparatus for improved automatic electronic form completion.

SUMMARY OF THE INVENTION

Methods and apparatus are described for sending completions to a client for aiding a user in completing electronic forms. The invention may identify a plurality of completions corresponding to a user; form a plurality of selected completions from the plurality of completions based, at least in part, on a use pattern of the user; and transmit the plurality of selected completions to a client associated with the user.

Additional aspects of the present invention are directed to computer systems and to computer-readable media having features relating to the foregoing aspects.

BRIEF DESCRIPTION OF THE DRAWINGS

The accompanying drawings, which are incorporated in and constitute a part of this specification, illustrate one embodiment of the invention and, together with the description, explain one embodiment of the invention. In the drawings.

FIG. 7 is a screen shot illustrating an electronic form with a plurality of completions, consistent with one embodiment of the invention.

DETAILED DESCRIPTION

The following detailed description of the invention refers to the accompanying drawings. The detailed description does not limit the invention. Instead, the scope of the invention is defined by the appended claims and equivalents.

The present invention includes methods and apparatus for assisting a user in completing fields within an electronic form. The invention captures and stores entries made by users and saves them as completions. In addition to the entries made by the user, these completions may also include additional information which assists the invention in determining whether to send these stored completions to the user. The invention selectively sends completions to the user based on the particular electronic form, the capability of the device associated with the user, and the available bandwidth.

The invention also allows a user to utilize the user's prior entries to assist in completing electronic forms from multiple devices.

Those skilled in the art will recognize that many other implementations are possible, consistent with the present invention.

Environment and Architecture

Figure 1:
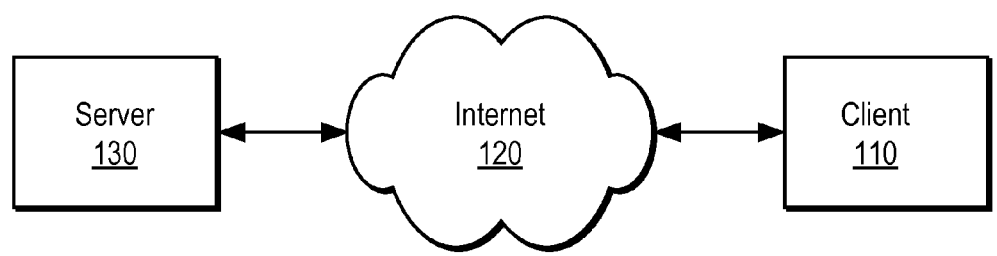
FIG. 1 is a diagram illustrating an environment within which the invention may be implemented.

FIG. 1 is a diagram illustrating an environment within which the invention may be implemented. The environment includes a client 110, a network 120, and a server 130.

The client 110 may be utilized by a user that is targeted to receive an electronic form. The electronic form may be viewable by the user through the client 110. The electronic form may provide a mechanism to request information from the user. For example, the mechanism to request information may include a web page having fillable fields. The client 110 may be a computer, a cellular phone, a personal digital assistant (PDA), or any networked device. The client 110 may contain a web browser as an interface between the user and the client 110.

The network 120 functions as a conduit for transmissions between the client 110 and the completion system 130. In one embodiment, the network 120 is the Internet. In another embodiment, the network 120 may be any type of transmission means.

The server 130 is configured to interface with the client 110 through the network 120. The server 130 is configured to store electronic forms with fillable fields for use by the client 110. For example, the user may receive an electronic form through the client 110. The user may be requested to provide information in a fillable field within the electronic form. The server 130 is also configured to store entries submitted by the user in response to the fields within the electronic forms.

In addition to a traditional server, the server 130 may be substituted for another client that plays the role as a sever such as in a peer to peer system.

Figure 2:
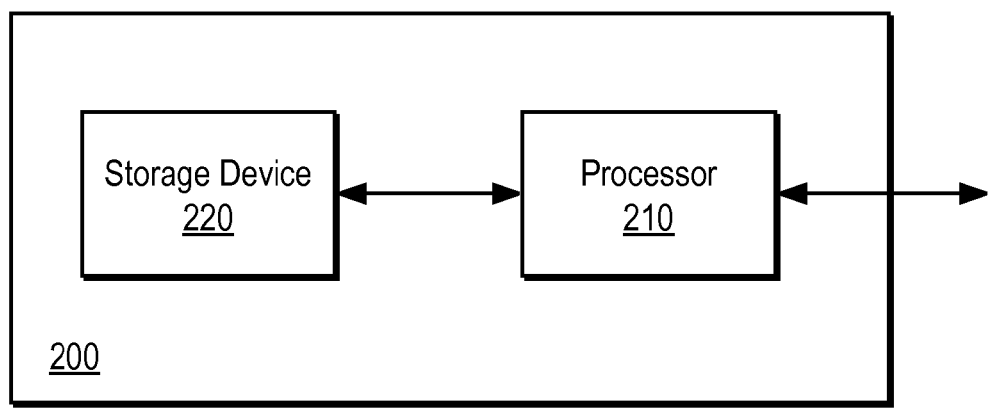
FIG. 2 is a simplified block diagram illustrating an electronic messaging system consistent with one embodiment of the invention.

FIG. 2 illustrates one embodiment of a completion system 200 consistent with the invention. The system 200 is configured to store entries submitted by the user in response to a fillable field within an electronic form. In one embodiment, the entries are also stored according to the type of fillable field associated with the entry. These entries submitted by the user are also referred to as completions.

For example, the fillable field within the electronic form may request an email address from the user. The email address provided by the user in response to this particular fillable field may be stored within a storage device 220. In addition to storing the email address entered by the user, the system 200 may also store the field type with the entry. In this example, the field type may be labeled "email address".

The system 200 is also configured to selectively transmit a plurality of selected completions to a device operated by the user such as the client 110 (FIG. 1). The plurality of selected completions are configured to aid the user in completing fillable fields within an electronic form. For example, the user may be completing a fillable field and may be able to complete the fillable field from the plurality of selected completions. In one embodiment of the present invention, the selected completions are transmitted (to, for example, client 110) together with an electronic form, though there are many options and alternatives for transmitting the selected completions. For example, in situations in which the selected completions are transmitted in a number of rounds (as further described herein), an initial set of selected completions may be transmitted with an electronic form, and subsequent completions may be transmitted separately from the form; such subsequent completions may be transmitted by themselves, together with additional communication from the system to the client, or by other methods. One of ordinary skill in the art will recognize that there are numerous ways in which the completions may be transmitted, taking into account communication (and protocol) efficiency, throughput, latency, processing time and many other factors.

The number of completions and the selection of which completions are part of the plurality of selected completions that are sent to the user's device is determined by a variety of factors. A processor 210 may coordinate the determination of which particular completions which comprise the plurality of selected completions.

The completion system 200 may be located in whole or in part within the client 110 and the server 130.

Figure 3:
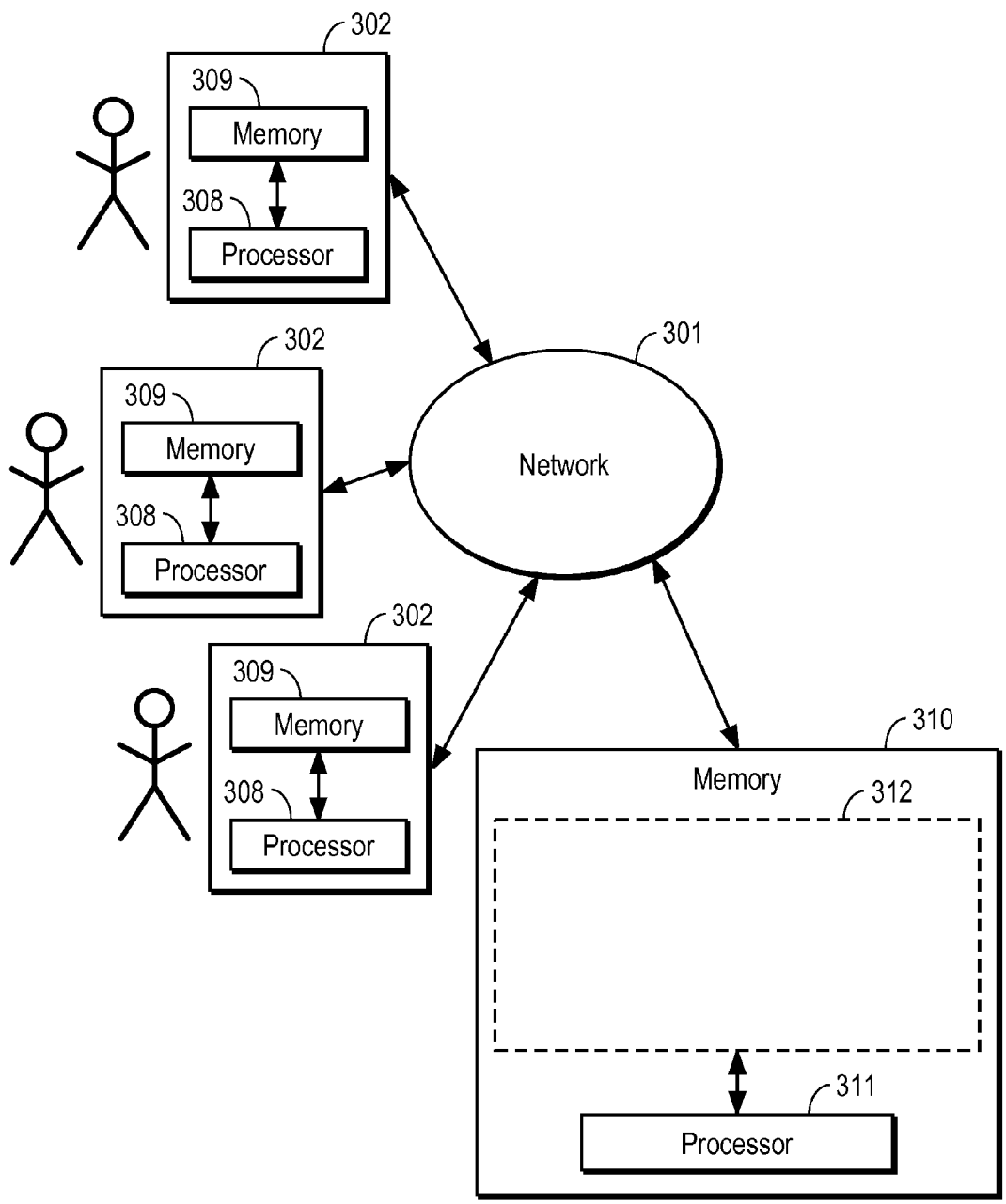
FIG. 3 is a simplified block diagram illustrating one embodiment in which the invention may be implemented.

FIG. 3 is a simplified diagram illustrating an exemplary architecture in which the present invention may be implemented. The exemplary architecture includes a plurality of web browsers 302, a server device 310, and a network 301. In one embodiment, the network 301 may be the Internet. The plurality of web browsers 302 are each configured to include a computer-readable medium 309, such as random access memory, coupled to a processor 308. Processor 308 executes program instructions stored in the computer-readable medium 309. In another embodiment, the plurality of web browsers 302 may also include a number of additional external or internal devices, such as, without limitation, a mouse, a CD-ROM, a keyboard, and a display.

Similar to the plurality of web browsers 302, the server device 310 may include a processor 311 coupled to a computer-readable medium 312. The server device 310 may also include a number of additional external or internal devices, such as, without limitation, a secondary storage element, such as database 340.

The plurality of target processors 308 and the server processor 311 can be any of a number of well known computer processors, such as processors from Intel Corporation, of Santa Clara, Calif. In general, the plurality of web browsers 302 may be any type of computing platform connected to a network and that interacts with application programs, such as a personal computer, a mobile lap top, a personal digital assistant, a "smart" cellular telephone, or a pager. The server 310, although depicted as a single computer system, may be implemented as a network of computer processors.

The plurality of web browsers 302 and the server 310 may include the system 200 (FIG. 2). In one embodiment, the plurality of computer-readable medium 309 and 312 may contain, in part, the system 200. Additionally, the plurality of web browsers 302 and the server 310 are configured to send and receive completions for use with the system 200. Similarly, the network 301 is configured to transmit completions for use with the system 200.

Operation

Figure 4:
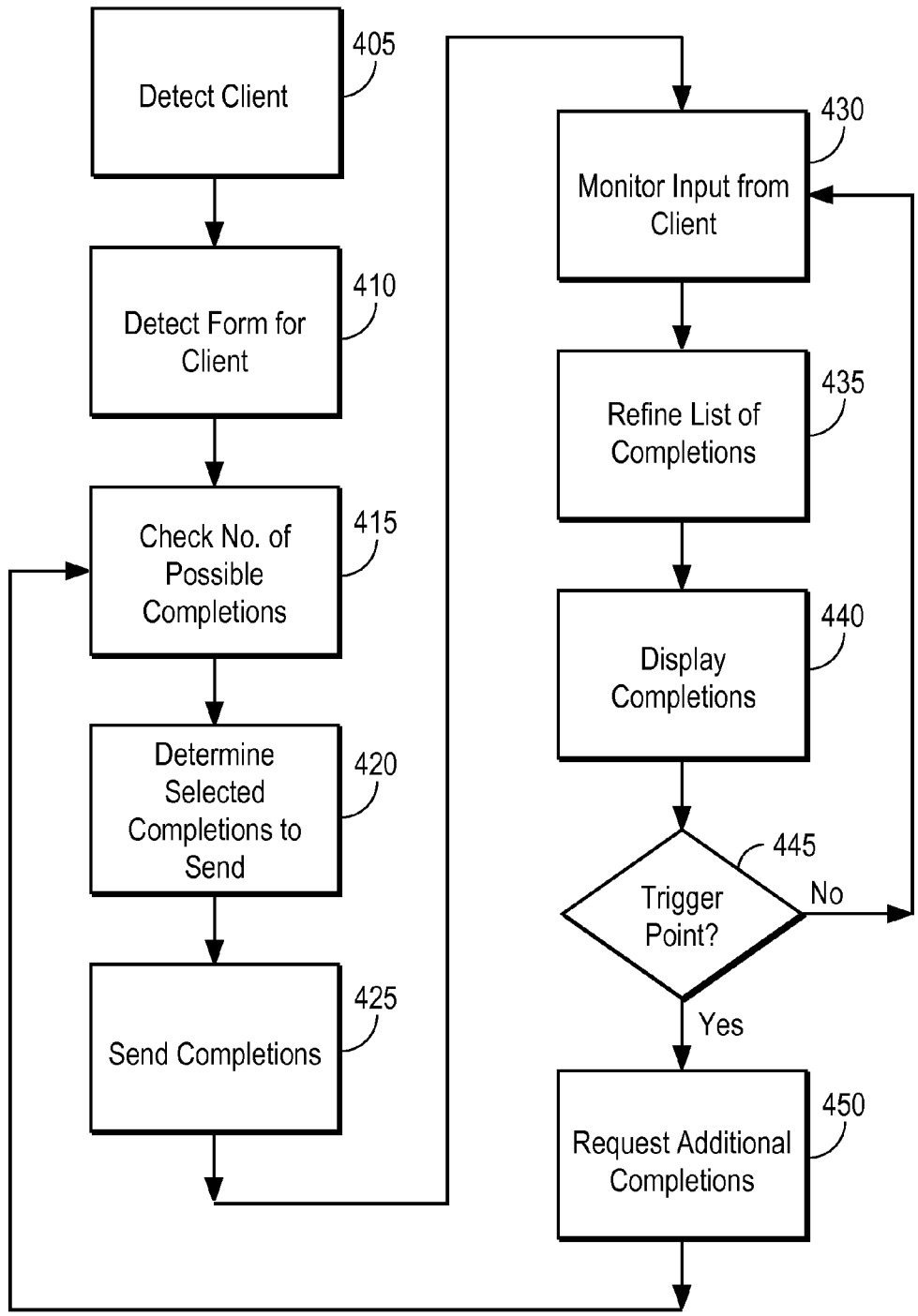
FIG. 4 is a flow diagram for determining and sending completions, consistent with one embodiment of the invention.
Figure 5:
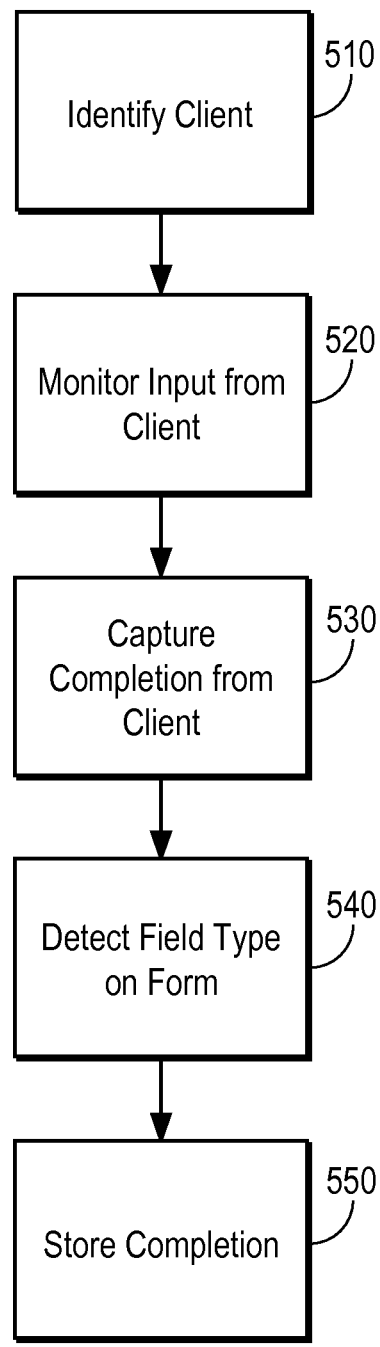
FIG. 5 is a flow diagram for capturing completions, consistent with one embodiment of the invention.
Figure 6:
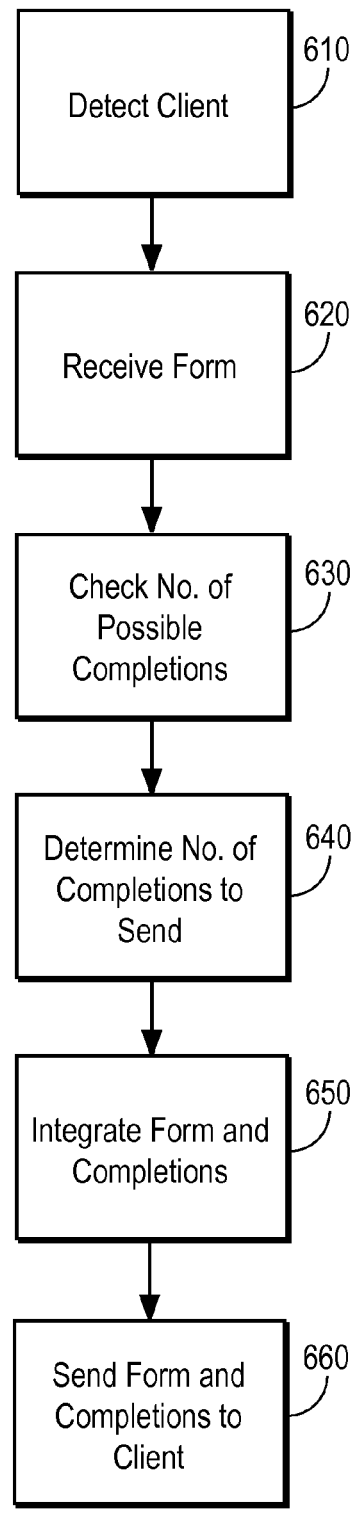
FIG. 6 is a flow diagram for determining and sending completions, consistent with one embodiment of the invention.

The flow diagrams as depicted in FIGS. 4, 5, and 6 are merely embodiments of the invention. In each embodiment, the flow diagrams illustrate the use of electronic messages within the system 200 (FIG. 2).

The blocks within the flow diagram may be performed in a different sequence without departing from the spirit of the invention. Further, blocks may be deleted, added, or combined without departing from the spirit of the invention.

The flow diagram in FIG. 4 illustrates one embodiment of selecting and sending possible completions to a client in response to a electronic form sent to the client.

In Block 405, the client being utilized by a user is detected. Detection of the client may include the device type utilized by the user. For example, the device types may include a personal computer, a PDA, a cellular phone, a pager, and the like. Detection of the client may also include the connection type utilized by the client. For example, the connection types include a T-1, broadband, dial-up, cellular, wireless protocols, GPRS, and the like. Similarly, detection of the client may also include the type and/or version of a client application (e.g. web browser), the settings within the client (e.g.

security settings, language settings, cookies, or preferences more generally), or any other aspect related to how the client handles data or interfaces with the user.

In Block 410, the electronic form intended to be received by the client is detected. The electronic form may include fillable fields to be completed by the user of the client. In one embodiment, the field type of each fillable field may be detected by the invention. Exemplary field types include an e-mail address, a name, an address, a social security number, financial accounts, and the like.

In one example, a unique list of possible completions is associated with each user. This unique list of possible completions may be gathered over a period of time by monitoring the entries made by a particular user in response to a fillable field.

In another example, the unique list of possible completions for a particular user may be substituted for a pre-filled list of possible completions. This pre-filled list of possible completions may contain completions which are popular among other users. This pre-filled list of possible completions may be especially useful as a starting point when the user is new and has not had the benefit of gathering completions over a period of time.

In Block 415, a check is performed to determine the total number of possible completions available for a particular user.

In Block 420, the invention determines the selected completions to send to the user through the client. The invention draws from the total number of possible completions to form the selected completions. Determining the number of selected completions to send to the user is based on a variety of factors.

For example, the device type and connection type utilized by the client may limit the number of selected completions that are transmitted to the client.

By limiting the number of selected completions transmitted to the client based on the device type and connection type, the risk of overwhelming the client or overtaxing the available bandwidth may be reduced.

For example, if the client is a device type with limited memory and/or processing capabilities, the invention allows a fewer number of completions to be sent to the client to prevent failure of the client. Similarly, if the client utilizes a connection type with limited bandwidth, the invention limits the number of selected completions sent to the client to prevent long transmission times.

The invention may select particular completions to be part of the selected completions to be sent to the user based on a variety of factors such as field types, frequency, and recency. In one embodiment, the field type requested in the fillable field of the electronic form may limit the number of completions sent to the client. The invention selects only relevant completions from the total number of possible completions with a specific field type corresponding to the field type of the fillable field to be part of the selected completions. For example, if the fillable field within the electronic form requests an email address, then the selected completions may be limited to those which have a field type of "email addresses".

The invention may also determine inclusion of particular completions as part of the selected completions based on the frequency the particular completion is used by the particular user. For example, a more frequently used completion which matches the field type of the fillable field within the electronic form may take priority over a less frequently utilized completion. In another example, if the user more commonly forwards email messages to a select group of email addresses, then this select group of email addresses is more likely to be included within the completions transmitted to the client.

The invention may also determine inclusion of particular completions as part of the selected completions based on the recency the particular completion is used by the particular user. For example, the more recently used completion utilized by the user may take priority over a completion less recently utilized by the user.

In one embodiment, the choice of completions to include within the selected completions may be conditioned on characteristics of the data or message that is being exchanged between the client/user and the server and/or information available about the client and user, using any number of probabilistic classification methods in addition to considering the frequency and recency of messages sent to various addresses. For example, a user may normally send an email to "Paul Apple" but often forwards e-mail with keywords such as "Project X" to "Paul Bunion". The completion system may distinguish the difference and set weighting for "Paul Apple" and "Paul Bunion" differently depending on the context or content of the message that is being sent.

As an additional optimization, the selected completions may be shared among multiple web page requests by placing the selected completions in a standard external file which is cached by the client. Then, the difference between the cached data and the newly selected completions is sent to the client. By sending the incremental completions, a savings in bandwidth may be achieved when performing completions across multiple forms for the same user.

In Block 425, completions are transmitted to the client. The actual number of completions transmitted to the client may depend on the total number of completions and the number of selected completions based on factors described previously.

If the total number of possible completions is less than or equal to the number of selected completions to send to client, then all the completions (total number of possible completions) may be sent to the client regardless of field type, frequency, recency, etc. For example, if the number of selected completions to send the client is determined to be X based on the device type and the connection type and X-1 represents the total number of completions associated with the user, then all X-1 completions may be sent to the client regardless of field type of the fillable field, frequency of the completions, recency of the completions, or other factors etc. In this example, the transmitted completions are the same as the total number of completions.

If the total number of possible completions is greater than the number of selected completions to send to client, then the number of selected completions represents the maximum number of completions transmitted to the client. In this example, the particular completions from all the completions (total number of possible completions) are selected based on field type, frequency, and recency. In this example, the transmitted completions are a subset of the total number of completions.

In Block 430, input from the user via the client is monitored. There are multiple ways to monitor input originating from the client. For example, the client may be configured to capture keystroke events from the user. Specific code that enables the client to capture keystroke events may already be present on the client.

If the client is not enabled to capture keystroke event from the user, then the specific code that enables this functionality may be sent to the client along with the completions in the Block 425. This specific code that enables capturing keystroke events may also be sent to the client along with the electronic form. The code that enables capturing keystroke events may be formatted into Jscript, ActiveX, VBScript, Java, and the like.

In Block 435, the completions transmitted in the Block 425 that are received by the client are selectively modified/refined. These transmitted completions, received by the client, may be refined based on the input from the user of the client. These refined completions are typically a subset of the transmitted completions.

For example, the user enters a character "P" as a first character in a fillable field of an electronic form requesting an email address. In this example, the completions within the refined completions become more narrow and are a subset of the transmitted completions. The refined completions may include email addresses associated with persons or entities having first names, last names, company names or other characteristics which begin with the character "P". In this example, email addresses associated with the character "P" such as someone@porsche.org may be included within the refined completions. Similarly, email addresses associated with entities such as "Paul Bunion", "John Peters", "Joe Porter", "Porsche Cars", or Ivan Rodriguez (nicknamed and commonly known as "Pudge" Rodriguez) may also be included within the refined completions.

Subsequent inputs from the user can also be monitored within the Block 430 and applied in the Block 435. For example, the user may enter a character "P" as a first character and a character "o" as a second character in a fillable field for an email address. In this example, email addresses associated with the characters "Po" such as someone@porsche.org may be included within the refined completions. Similarly, email addresses associated with entities such as "Joe Porter", and "Porsche Cars" may also be included within the refined completions. In contrast to the prior example, "Paul Bunion", "John Peters" and "Ivan Rodriguez" may be eliminated as part of the refined completions based on the entry of "Po".

In contrast to adding characters to a fillable field, there may be circumstances where the refined selection may include additional completions and become more inclusive when the user removes a character which was entered as prior input. For example, additional completions from the transmitted completions may be added back to the refined completions.

In Block 440, the refined completions are displayed on the client. In one embodiment, the refined completions are displayed within the fillable field of the electronic form on the client. In another embodiment, the refined completions are displayed within the electronic form as a drop down menu from the fillable field. By displaying the refined completions outside the area of the fillable field, the refined completions can be displayed without disrupting the user from entering data into the fillable field.

In an embodiment of the invention described by FIG. 4, a trigger point is associated with a request for additional completions beyond the transmitted completions. The trigger point may be activated based on input from the user via the client.

For example, the transmitted completions already sent to the client includes, in part, the five most frequently used email addresses for persons with the first name, last name, company name, or otherwise associated with "Paul". The user continues to type an additional character after "Paul". By continuing to enter an additional character after "Paul", the user may demonstrate that the transmitted completions delivered to the client are not sufficient and additional completions transmitted to the client may be useful. The trigger point may be activated based on the input from the user to seek additional completions.

In another example, the transmitted completions already sent to the client includes "Paul Bunion" and "Paul *". If the user enters a character "P", both "Paul Bunion" and "Paul *" may be displayed. Paul Bunion is shown as the likeliest completion. However, the "Paul *" indicates that there are additional entries beginning with "Paul" which are not part of the transmitted completions. If the user continues to type a character "a" which cumulatively reflects a string of "Pa", then the user may wish to select a different "Paul". The trigger point may be activated based on the input from the user to seek additional completions.

In Block 445, the input from the client is analyzed for trigger points. If the trigger point is found in the Block 445, additional completions may be requested in Block 450. In one embodiment, the additional completions conform with the limitations in response to the input from the user. The transmission of additional completions may utilize processes which are described in the Blocks 415, 420, and 425.

If the trigger point is not found in the Block 445, additional input from the user is monitored in the Block 430.

The number of rounds of completions which are sent to the client and the number of selected completions sent in each round to the client impact the amount of bandwidth that is utilized for performing the completions. In some cases, sending completions to the client is terminated after one round without sending all the possible completions.

The flow diagram in FIG. 5 illustrates one embodiment of storing a completion from input entered by a user through a client. In Block 510, the user and the associated client are uniquely identified.

In Block 520, input from the client is monitored. In one embodiment, the interface module 240 is configured to monitor the input from the client.

In Block 530, a completion is captured from the client. A completion for an email address may be captured through both received email messages and sent email messages. The completions for capture are not limited to items entered by the user.

In Block 540, the field type associated with the completion is detected.

The field type corresponds with a fillable field within the electronic form. The field type may include an email address, an address, a name, a financial account, and the like.

In Block 550, the completion is stored. The completion may be associated with a particular user. Similarly, the completion may be associated with a particular field type. If the completion is identical to previously stored completion, then the previously stored completion is updated to reflect the frequency of this particular completion. The stored completion may also be associated with the recency. The field type, frequency, and/or recency may be utilized to determine whether the stored completions should be part of the selected completions as shown in the Block 420.

The flow diagram in FIG. 6 illustrates one embodiment of receiving an electronic form and sending the electronic form and completions to a client associated with a user.

In Block 610, the user and corresponding client are detected. Detection of the device associated with the client may include the device type utilized by the user such as a laptop, a personal computer, a PDA, a cellular phone, a pager, and the like. Detection of the client may also include the connection type utilized by the device associated with the client such as T-1, broadband, dial-up, cellular, and the like.

In Block 620, the electronic form intended to be received by the client is received by the system 200 (FIG. 2). The electronic form may include fillable fields to be completed by the user. The invention may detect the field type requested by the fillable field such as e-mail address, name, address, social security number, financial accounts, and the like.

In Block 630, a check is performed on the total number of possible completions available be sent to the client.

In Block 640, the selected completions to send to the client are determined. The selected completions may be determined based on several parameters such as the number of selected completions, the field type of the completion, the frequency of the completion, and the recency of the completion. These parameters are discussed in detail under the Block 420 (FIG. 4).

In Block 650, the electronic form received by the system 200 is integrated with the selected completions determined in the Block 640.

In Block 660, the integrated electronic form and the selected completions are sent to the client.

FIG. 7 illustrates a sample screen shot 700 showing an exemplary interface of the completion system, consistent with one embodiment of the invention. The screen shot 700 includes an electronic form 710, a field 720, and a drop down menu 730. In this example, the electronic form 710 is configured to accept information such as a city and state. In other embodiments, the electronic form 710 may accept any type of information.

In this example, the field 720 is configured to accept information corresponding to a city. As shown in the screen shot 700, a letter "b" is shown within the field 720.

The drop down menu 730 includes a plurality of completions 740 and a symbol 750. As shown in the screen shot 700, the plurality of completions 740 includes"Baldwin", "Barbour", "Bibb", "Blount", "Bullock", "Butler", "Badger", "MountBadger", and "Barrow". In one embodiment, the symbol 750 represents additional completions are available but are not shown within the drop down menu 730.

In one embodiment, the completion system senses the letter "b" entered within the field 720 and provides the plurality of completions 740 within the drop down menu 730. The individual completions within the plurality of completions 740 begin with the letter "b". The completion "Mount Badger" is also included, because this completion is associated with a concept beginning with the letter "b' (namely, the second term within this completion begins with the letter "b").

The completion "Baldwin" 760 is shown in the screen shot 700 as being distinguished from the plurality of completions within the drop down menu 730. In this example, the completion 760 is shown highlighted to indicate that the completion 760 is currently selected from the plurality of completions 740. However, in other embodiments, other techniques may be utilized to distinguish the completion "Baldwin" 760 from other completions. In one embodiment of the present invention, completions may also be distinguished (via highlighting, font, size, or any other indicia) to indicate completions suggested or recommended by the completion system.

Similarly, in one aspect of the invention the selected completions are presented to the user (e.g. in a drop down menu) in an order determined at least in part based on estimates by the completion system regarding the preferred or likely completions desired by the client/user. In general, the presentation order may utilize the same considerations that inform the choice of selected completions to send to the client. The presentation order may take into account the factors previously mentioned herein, such as field type, frequency of usage, recency of usage, the context or content of the message, etc., and in one embodiment may be grouped or clustered according to similarity in name, context, meaning, location, or any other measure, according to methods familiar to those of ordinary skill in the art.

Figure 8:
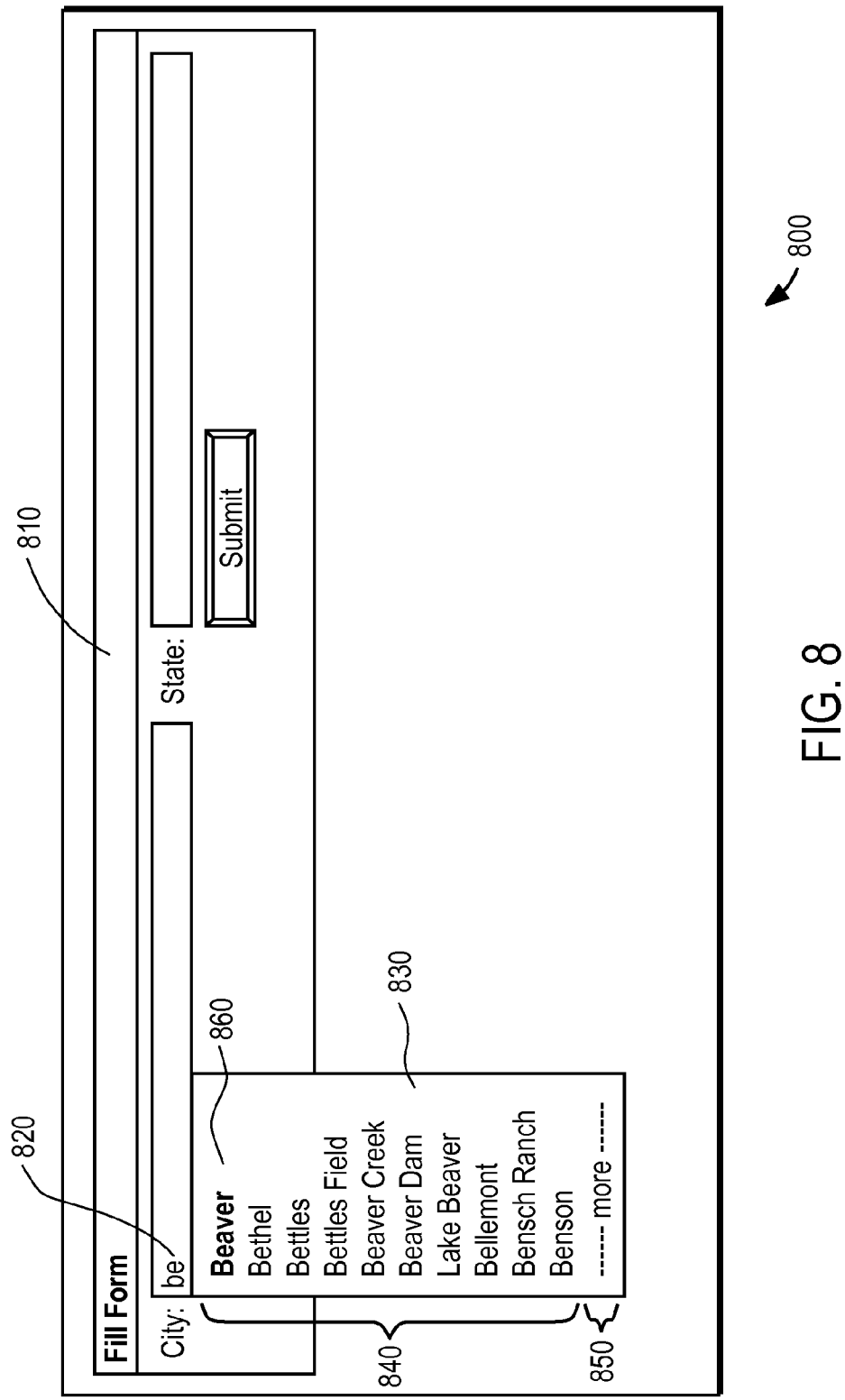
FIG. 8 is a screen shot illustrating an electronic form with a plurality of completions, consistent with one embodiment of the invention.

FIG. 8 illustrates a sample screen shot 800 showing an exemplary interface of the completion system, consistent with one embodiment of the invention. The screen shot 800 includes an electronic form 810, a field 820, and a drop down menu 830. Similar to the electronic form 710, the electronic form 810 is configured to accept information such as a city and state. In other embodiments, the electronic form 810 may accept any type of information.

In this example, the field 820 is configured to accept information corresponding to a city. As shown in the screen shot 800, the letters "be" are shown within the field 820.

The drop down menu 830 includes a plurality of completions 840 and a symbol 850. As shown in the screen shot 800, the plurality of completions 740 includes "Beaver", "Bethel", "Bettles", "Bettles Field", "Beaver Creek", "Beaver Dam", "Lake Beaver", "Bellemont", "Bensch Ranch", and "Benson". In one embodiment, the symbol 850 represents additional completions are available but are not shown within the drop down menu 830.

In this example, the completion system senses the letters "be" entered within the field 820 and provides the plurality of completions 840 within the drop down menu 830. The individual completions within the plurality of completions 840 begin with or correspond to the letters "be" in response to the letters "be" within the field 820.

The completion "Beaver" 860 is shown in the screen shot 800 as being distinguished from the plurality of completions within the drop down menu 830. In one embodiment, the completion 860 is shown highlighted to indicate that the completion 860 is currently selected from the plurality of completions 840.

In one embodiment, the individual completions within the plurality of completions 840 are shown ordered by the likelihood of being utilized. The likelihood of being utilized may depend of frequency and recency of use. For example, the completion 860 may be displayed at the top of the plurality of completions 860, because the completion 860 is the most likely completion to be utilized.

CONCLUSION

The foregoing descriptions of specific embodiments of the invention have been presented for purposes of illustration and description. For example, the invention is described within the context of web forms as merely one embodiment of the invention. The invention may be applied to a variety of other electronic data gathering embodiments.

For the sake of clarity, the foregoing references to "client" are a figurative aid to illustrate a particular device which is utilized by a specific user.

For the sake of clarity, operation of the invention is described with email addresses that are utilized as completions as merely one embodiment. Other types of fields may be utilized as completions with the invention.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed:

1. A method of capturing completions, performed at a server having one or more processors and memory, comprising:
   receiving a plurality of completions from a client device associated with a user, wherein one or more of the plurality of completions is captured from user entries in fillable form fields and at least one completion of the plurality of completions is captured from an additional source distinct from the fillable form fields;
   storing the plurality of completions as stored completions;
   associating the stored completions with the user; and
   in response to a user action at the client device:
      forming a plurality of selected completions from the plurality of completions, wherein the plurality of selected completions includes the at least one completion captured from an additional source; and
      transmitting the plurality of selected completions to the client device;
      wherein the at least one completion captured from an additional source includes a completion captured from (A) an email message received by the user or (B) an email message sent by the user.

2. The method of claim 1, further comprising identifying a field type corresponding to the plurality of completions.

3. The method of claim 2, wherein storing the completions further comprises storing the field type corresponding to the plurality of completions.

4. The method of claim 2, wherein the field type is selected from the group consisting of postal address, email address, first name, last name, company name, financial account, social security number, and phone number.

5. The method of claim 1, further comprising identifying a use pattern of the user associated with the stored completions, wherein forming the plurality of selected completions from the plurality of completions is based, at least in part, on predicting from the use pattern which of the plurality of completions the user is likely to use to complete an electronic form, and including in the selected completions at least a subset of such likely completions.

6. A computer system for assisting in the completion of a form, comprising:
   memory;
   one or more processors; and
   one or more programs stored in the memory and configured for execution by the one or more processors, the one or more programs including:
      instructions for receiving a plurality of completions from a client device associated with a user, wherein one or more of the plurality of completions is captured from user entries in fillable form fields and at least one completion of the plurality of completions is captured from an additional source distinct from the fillable form fields;
      instructions for storing the plurality of completions as stored completions;
      instructions for associating the stored completions with the user; and
      instructions for responding to a user action at the client device, including:
         instructions for forming a plurality of selected completions from the plurality of completions, wherein the plurality of selected completions includes the at least one completion captured from an additional source; and
         instructions for transmitting the plurality of selected completions to the client device;
      wherein the at least one completion captured from an additional source includes a completion captured from (A) an email message received by the user or (B) an email message sent by the user.

7. The computer system of claim 6, further comprising instructions for identifying a field type corresponding to the plurality of completions.

8. The computer system of claim 7, wherein the instructions for storing the completions further comprise instructions for storing the field type corresponding to the plurality of completions.

9. The computer system of claim 7, wherein the field type is selected from the group consisting of postal address, email address, first name, last name, company name, financial account, social security number, and phone number.

10. The computer system of claim 6, further comprising instructions for identifying a use pattern of the user associated with the stored completions, wherein forming the plurality of selected completions from the plurality of completions is based, at least in part, on predicting from the use pattern which of the plurality of completions the user is likely to use to complete an electronic form, and including in the selected completions at least a subset of such likely completions.

11. A non-transitory computer readable storage medium storing one or more programs to be executed by a computer system, the one or more programs comprising:
   instructions for receiving a plurality of completions from a client device associated with a user, wherein one or more of the plurality of completions is captured from user entries in fillable form fields and at least one completion of the plurality of completions is captured from an additional source distinct from the fillable form fields;
   instructions for storing the plurality of completions as stored completions;
   instructions for associating the stored completions with the user; and
   instructions for responding to a user action at the client device, including:
      instructions for forming a plurality of selected completions from the plurality of completions, wherein the plurality of selected completions includes the at least one completion captured from an additional source; and
      instructions for transmitting the plurality of selected completions to the client device;
      wherein the at least one completion captured from an additional source includes a completion captured from (A) an email message received by the user or (B) an email message sent by the user.

12. The non-transitory computer readable storage medium of claim 11, further comprising instructions for identifying a field type corresponding to the plurality of completions.

13. The non-transitory computer readable storage medium of claim 12, wherein the instructions for storing the completions further comprise instructions for storing the field type corresponding to the plurality of completions.

14. The non-transitory computer readable storage medium of claim 12, wherein the field type is selected from the group consisting of postal address, email address, first name, last name, company name, financial account, social security number, and phone number.

15. The non-transitory computer readable storage medium of claim 11, further comprising instructions for identifying a use pattern of the user associated with the stored completions, wherein forming the plurality of selected completions from the plurality of completions is based, at least in part, on predicting from the use pattern which of the plurality of completions the user is likely to use to complete an electronic form, and including in the selected completions at least a subset of such likely completions.

16. A method of capturing and using completions, performed at a client device having one or more processors and memory, comprising:
   detecting one or more first completions from user entries in fillable form fields;
   transmitting the first completions from the client device to a server;
   detecting a second completion associated with the user, wherein the second completion is captured from an additional source distinct from the fillable form fields;
   transmitting the second completion from the client device to the server;
   detecting user entry in a field on a fillable form; and
   in accordance with the detected user entry:
      receiving from the server a plurality of completions corresponding to the field on the fillable form, wherein the plurality of completions includes the second completion; and
      presenting the plurality of completions to the user for selection;
   wherein the second completion captured from an additional source comprises a completion captured from (A) an email message received by the user or (B) an email message sent by the user.

17. A computer system for capturing and using completions, comprising:
   memory;
   one or more processors; and
   one or more programs stored in the memory and configured for execution by the one or more processors, the one or more programs including:
      instructions for detecting one or more first completions from user entries in fillable form fields;
      instructions for transmitting the first completions from the client device to a server;
      instructions for detecting a second completion associated with the user, wherein the second completion is captured from an additional source distinct from the fillable form fields;
      instructions for transmitting the second completion from the client device to the server;
      instructions for detecting user entry in a field on a fillable form; and
      instructions for responding to the detected user entry, including:
         instructions for receiving from the server a plurality of completions corresponding to the field on the fillable form, wherein the plurality of completions includes the second completion; and
         instructions for presenting the plurality of completions to the user for selection;
      wherein the second completion captured from an additional source comprises a completion captured from (A) an email message received by the user or (B) an email message sent by the user.

18. A non-transitory computer readable storage medium storing one or more programs to be executed by a computer system, the one or more programs comprising:
   instructions for detecting one or more first completions from user entries in fillable form fields;
   instructions for transmitting the first completions from the client device to a server;
   instructions for detecting a second completion associated with the user, wherein the second completion is captured from an additional source distinct from the fillable form fields;
   instructions for transmitting the second completion from the client device to the server;
   instructions for detecting user entry in a field on a fillable form; and
   instructions for responding to the detected user entry, including:
      instructions for receiving from the server a plurality of completions corresponding to the field on the fillable form, wherein the plurality of completions includes the second completion; and
      instructions for presenting the plurality of completions to the user for selection;
   wherein the second completion captured from an additional source comprises a completion captured from (A) an email message received by the user or (B) an email message sent by the user.

19. A method for assisting in the completion of a form, performed at a client device having one or more processors and memory, comprising:
   detecting and storing one or more first completions from user entries in fillable form fields;
   detecting a second completion associated with the user, wherein the second completion is captured from an additional source distinct from the fillable form fields;
   storing the second completion;
   detecting user entry in a field on a fillable form;
   identifying a plurality of completions corresponding to the field on the fillable form, wherein the plurality of completions includes the second completion; and
   presenting the plurality of completions to the user for selection;
   wherein the second completion captured from an additional source comprises a completion captured from (A) an email message received by the user or (B) an email message sent by the user.

* * * * *